United States Patent
Vijayakumar

(10) Patent No.: US 8,217,091 B2
(45) Date of Patent: Jul. 10, 2012

(54) METHOD AND SEALANT FOR SEALING AIR FILTER LEAKS

(76) Inventor: R. Vijayakumar, Liverpool, NY (US)

( * ) Notice: Subject to any disclaimer, the term of this patent is extended or adjusted under 35 U.S.C. 154(b) by 0 days.

(21) Appl. No.: 13/307,507

(22) Filed: Nov. 30, 2011

(65) Prior Publication Data
US 2012/0077892 A1    Mar. 29, 2012

Related U.S. Application Data

(62) Division of application No. 12/355,660, filed on Jan. 16, 2009, now abandoned.

(60) Provisional application No. 61/021,749, filed on Jan. 17, 2008.

(51) Int. Cl.
| | |
|---|---|
| C08K 9/08 | (2006.01) |
| C08K 13/02 | (2006.01) |
| C08K 13/04 | (2006.01) |
| C08K 3/40 | (2006.01) |
| B05D 3/00 | (2006.01) |

(52) U.S. Cl. ........... 521/78; 401/190; 222/394; 427/140

(58) Field of Classification Search .................. 401/190; 222/394; 521/78; 427/140
See application file for complete search history.

(56) References Cited

U.S. PATENT DOCUMENTS

| | | | |
|---|---|---|---|
| 2,575,687 A | 11/1951 | Simon | |
| 4,529,741 A * | 7/1985 | Bauman et al. | 521/99 |
| 4,584,324 A * | 4/1986 | Bauman et al. | 521/88 |
| 5,505,344 A * | 4/1996 | Woods | 222/394 |

* cited by examiner

*Primary Examiner* — Satya Sastri
(74) *Attorney, Agent, or Firm* — George R. McGuire; Frederick J M Price; Bond Schoeneck & King

(57) ABSTRACT

The present invention relates generally to a patch including a micro fiber glass and a polymeric binder, where the mixture forms an in situ porous patch that allows for active filtration after application to a leak or hole in an air filter. The mixture can be pressurized with a propellant within a housing prior to application to a leak or hole in an air filter. The mixture can also be applied manually to a leak or hole in an air filter, without the need to be pressurized with a propellant within a housing.

16 Claims, 2 Drawing Sheets

METHOD AND SEALANT FOR SEALING AIR FILTER LEAKS

CROSS-REFERENCE TO RELATED APPLICATION

The present application is a divisional application of U.S. patent application Ser. No. 12/355,660, filed on Jan. 16, 2009, which claims priority to U.S. provisional patent application No. 61/021,749, filed on Jan. 17, 2008, each of which is hereby incorporated by reference herein in its entirety.

BACKGROUND OF THE INVENTION

1. Field of Invention

The present invention relates generally to a method and composition for patching air filter leaks, and, more particularly, to a method and patch for patching high efficiency air filter leaks without blocking significant parts of the filter and for allowing for active filtration after application of the patch to a leak or hole in the filter.

2. Description of Prior Art

High efficiency air filters, commonly called HEPA or ULPA air filters, are widely used to produce particle free air in a variety of industrial and commercial facilities. The activity and processes taking place within many of these facilities will be adversely affected by contamination from particles in the airflow. These particles can include, for example, contaminants that adversely affect drugs produced in a pharmaceutical plant, cause a defect in a semiconductor wafer, or act as an undesirable foreign body in a drug compounded in a pharmacy.

Particle contamination mainly occurs due to leaks in filters that allow unfiltered air to pass through the filter, and affect the cleanliness of the facility. For this reason, leaks in HEPA and ULPA air filters are not acceptable, and hence are conventionally repaired or patched as shown in FIG. 1 (discussed below). Leaks in filters usually occur due to pinhole size blemishes caused during filter manufacturing or during use. Guidelines for acceptable repairing practice are given in most of the prevailing national and international standards (as should be appreciated by those skilled in the art, and need not be repeated herein).

As seen in FIGS. 1a-b, HEPA and ULPA air filters 10 are constructed by pleating filter media 100 into an accordion style construction. FIG. 1a shows a schematic face view of a cross section of an air filter 10 illustrating accordion style pleated air filter media 100 common to HEPA and ULPA air filters. The pleat shape and size as well as the method of holding the filter media 100 in place vary to accommodate the end use. The media 100 used in most HEPA and ULPA filters are made from micro fiberglass with fiber diameters as small as 200 nm and lengths of a few millimeters. These fibers are held together in a thin web by a small quantity of polymeric binder. The most common polymeric binder used for such media are thermosetting or thermoplastic acrylic ester latex polymers with other additives such as water repellants that are proprietary to the manufacturer of these media. These webs are about 0.5 mm thick and are usually made on a paper machine from a slurry of fibers and to which the polymeric binder is added either in the slurry or separately.

Typical fibrous structures of such filter media 100 and its multiple fiber layers are shown in magnified (scanning electron microscope ("SEM")) views in FIGS. 2a-b. Although each layer of the media appears to be inhomogeneous, a typical media is made up of several hundred layers of fibers. Thus, only a true blemish or pinhole will result in a leak that will require repair.

FIG. 1b is an expanded view of a portion of the air filter 10 as shown in FIG. 1a. FIG. 1b illustrates a section which contains a suspected leak that needs to be patched. As shown in FIG. 1b, current repair practice uses polymeric sealing or caulking compounds 120 to seal/patch the area around a suspected leak 110. Conventional sealing compounds 120 include silicone and silicone based caulks, poly urethane, and other similar caulking compounds. Most of the time, since leaks are repaired in the field on installed filters, a caulk like consistency is required for the sealing compound to permit repairs overhead in ceilings, for example. In cases where it is practical, such as in a factory, a nearly liquid sealant is poured into the space between the folded filter media near the location of the leak. This blocking technique, while effective in sealing the leak 110, blocks significant parts of the filter 10 thereby reducing the filter's effectiveness (dark patch 120). Further, the application of such sealing or caulking compounds 120 to seal leaks 110 in filters 10 already installed in ceilings, for example, often proves to be a cumbersome and inefficient procedure.

SUMMARY OF THE INVENTION

It is therefore a principal object and advantage of the present invention to at least partially seal (and preferably completely seal) air filter leaks without blocking significant parts of the filter, which would result in a reduction in the filter's effectiveness.

In accordance with the foregoing object and advantage, an embodiment of the present invention provides a sealant or patch that takes advantage of the fibrous nature of air filter media, and allows for active filtration through and around the leak. As compared with conventional sealing technology, the sealant does not completely seal or block a significant part of the filter (i.e., it is porous), thus allowing for this active filtration. The present invention also provides a method of sealing air filter leaks with the porous patch.

In accordance with an embodiment of the present invention, a sealant is provided which includes a mixture of a micro fiber glass, and a polymeric binder. The glass fibers can include, but are not limited to borosilicate fibers. The polymeric binder can include, but is not limited to, acrylic ester latex, urethane, and a moisture cure adhesive. The propellant can include, but is not limited to a compressed gas selected from the group consisting of air, nitrogen, and a non-highly flammable gas (as should be appreciated by those skilled in the art). The mixture can also include a solvent including, but not limited to, water, alcohol, and a mineral spirit. The mixture can be pressurized with a propellant within a housing including, but not limited to, an aerosol can. The mixture can contain less than 10% micro fiber glass, and up to 50% polymeric binder (preferably between 5-50%).

In accordance with an embodiment of the present invention, a method of sealing a leak in a portion of an air filter is provided. The method includes, but is not limited to, applying a sealant comprising a mixture of a micro fiber glass and a polymeric binder to the portion of the air filter which includes the leak, and allowing the sealant to cure. The mixture can optionally be pressurized with a propellant within a housing, such as an aerosol can. The mixture can further include a solvent. The sealant can be applied by spraying the sealant from the aerosol can on the portion of the air filter which includes the leak, or can be applied manually to the air filter. Curing can be facilitated by applying heat to the sealant, or by the application of air flow.

In accordance with an alternative embodiment of the present invention, a method of sealing a leak in a portion of an air filter is provided. The method includes, but is not limited to, applying a first mixture comprising a micro fiber glass and a solvent, wherein the mixture is pressurized with a propellant within a first housing, to the portion of the air filter which includes the leak; applying a second mixture comprising a polymeric binder and a solvent, wherein the mixture is pressurized with a propellant within a second housing, to the portion of the air filter which includes the leak; and allowing the first mixture and second mixture combination (i.e., sealant) to cure. The first and second housings can be aerosol cans. Curing can be facilitated by applying heat to the sealant, or by the application of air flow.

In accordance with an additional embodiment of the present invention, a method of sealing a leak in a portion of an air filter is provided. The method includes, but is not limited to, applying a sealant comprising a mixture of a micro fiber glass, a polymeric binder, and a solvent to the portion of the air filter which includes the leak, and allowing the sealant to cure. Applying the sealant may be accomplished by brushing the sealant over the portion of the air filter which includes the leak. Curing can be facilitated by applying heat to the sealant, or by the application of air flow.

BRIEF DESCRIPTION OF THE DRAWINGS

The present invention will be more fully understood and appreciated by reading the following Detailed Description in conjunction with the accompanying drawings, in which.

DETAILED DESCRIPTION

Figures 1A, 1B:
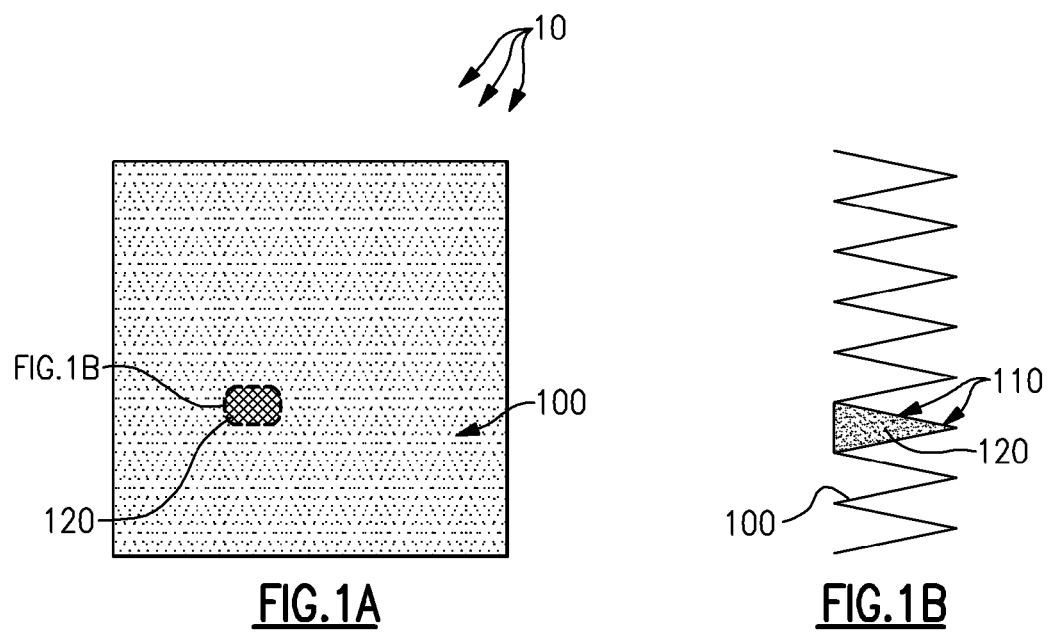
FIGS. 1a-b are schematic views illustrating a cross section of an accordion style pleated air filter media common to HEPA and ULPA air filters, and conventional repairing or patching of air filter leaks.
Figures 2A, 2B:
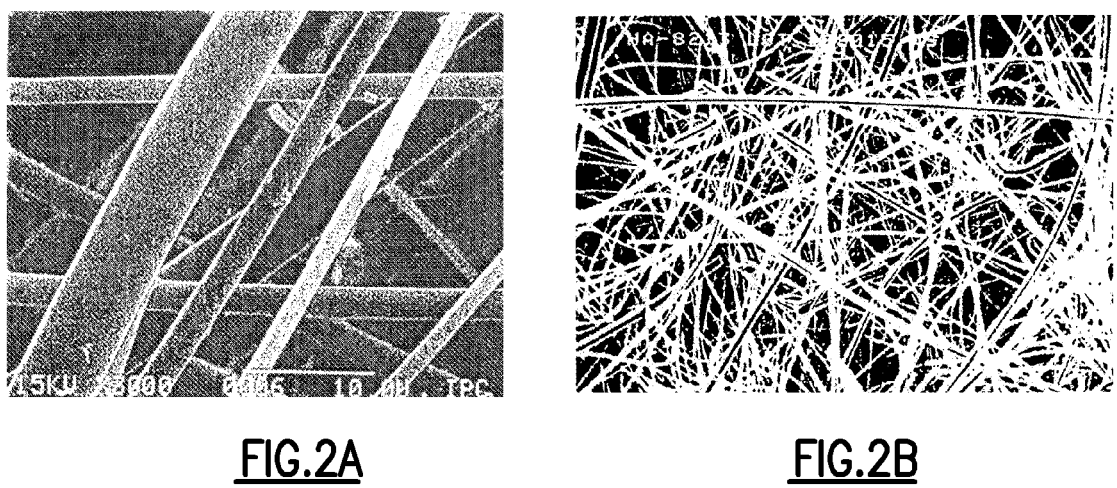
FIGS. 2a-b are magnified (scanning electron microscope ("SEM")) views illustrating the fibrous structure of air filter media and its multiple fiber layers.

Reference will now be made in detail to the present preferred embodiments of the invention, wherein like reference numerals refer to like components, examples of which are illustrated in the accompanying drawing.

In accordance with an embodiment of the present invention, the sealant comprises a mixture made of three components including, but not limited to, a micro fiber glass, a sealing binder, and a solvent vehicle for the mixture. The sealant mixture can be pressurized with a propellant, as discussed further below.

The microfiber glass component can include, but is not limited to, borosilicate fibers similar to the composition and size of glass fibers used in most HEPA and ULPA filters (as should be appreciated by those skilled in the art), where the fibers typically range from about 80-1000 nm diameters and can be as long as 5 mm.

The binder component can be either an acrylic ester latex similar to the binders used in the media (as should be appreciated by those skilled in the art), or can be other polymeric material such as urethane, silicone, other adhesives or materials with special properties such as moisture cure adhesives that may offer advantages for use in the field (such as quicker setting times than the acrylic esters, or setting with moisture instead of heat, etc. . . . ).

The primary fluid/solvent component for dispersing the micro fiber glass and binder mixture can be water, since glass fibers most readily disperses in low pH water. Since glass fibers typically used in filter media most readily disperse in cationic solvents, alternative solvents which are cationic or those that can be made cationic by addition of cationic materials, can also be used. These alternative solvents include but are not limited to, solvents such as alcohol, mineral spirits with cationic additives, etc.

The propellant can include, but is not limited to, air or any non-highly flammable gas commonly used for aerosol spray cans including nitrogen or carbon dioxide.

The sealant mixture noted above can have a low concentration of fibers to permit ease of application. In accordance with a preferred embodiment of the present invention, the aqueous mixture used for making the sealant mixture generally has less than 10% fiber. The binder content may vary, e.g., usually under 50%. This percentage of the binder depends on certain factors. For example, if the percentage of the binder gets to low, e.g., below 5%, the sealant may not be effective or as effective. On the other hand, if the percentage of the binder is too high, e.g., above 50%, the sealant may be too difficult to apply.

The sealant is prepared by creating and mixing a slurry of the micro fiber glass component (similar to those used in the air filter media) and the binder component, with a propellant. As shown in FIG. 3c (discussed further below) an aerosol can 200 is charged with this fiber, binder, solvent mixture 210, and pressurized with the propellant such as a compressed gas 220 (air, nitrogen, etc.).

Figure 3A:
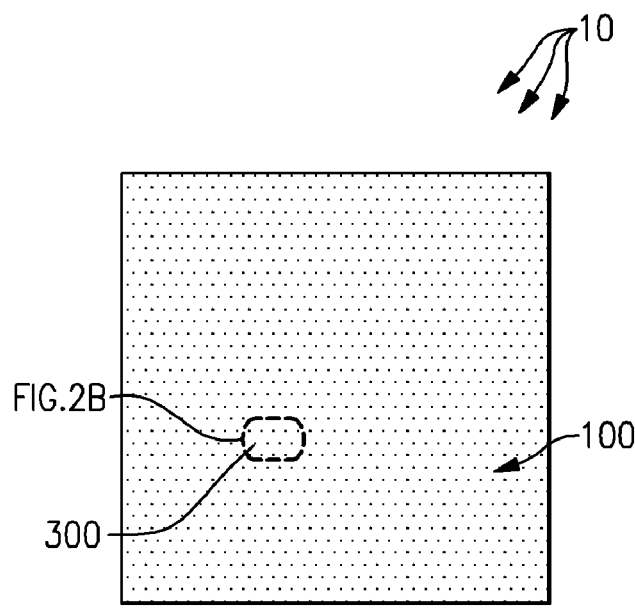
FIGS. 3a-c are schematic scanning electron microscope views illustrating a cross section of an accordion style pleated air filter media common to HEPA and ULPA air filters, a sealant for air filter leaks (such as HEPA and ULPA high efficiency air filters), and the sealant's method of application, in accordance with an embodiment of the present invention.
Figure 3B:
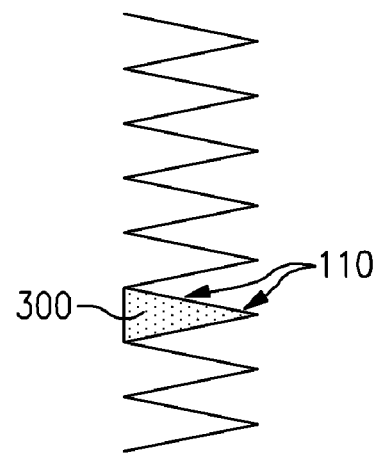
Figure 3C:
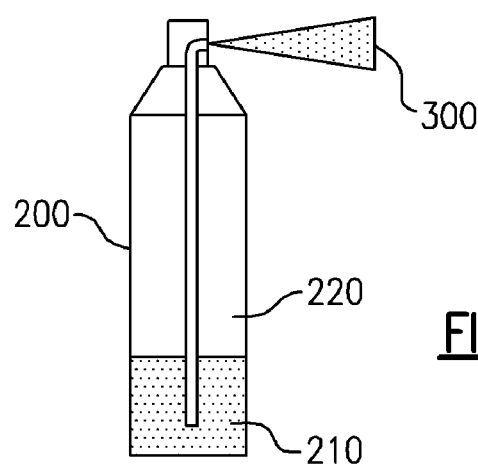

Turning to FIGS. 3a-c, a schematic face view of a cross section of an air filter (such as HEPA and ULPA high efficiency air filters), a sealant for air filter leaks, and the sealant's method of application are illustrated, in accordance with an embodiment of the present invention.

FIG. 3a is a schematic face view of a cross section of an air filter 10 illustrating accordion style pleated air filter media 100 common to HEPA and ULPA air filters.

FIG. 3b is an expanded view of a portion (portion "A") of the air filter 10 as shown in FIG. 3a. This portion illustrates a section which contains a suspected leak that needs to be patched, and is shown patched with the sealant mixture 210 as applied as a fine fiber spray 300 (shown lighter than 120 in FIG. 1b).

In accordance with an embodiment of the present invention, the sealing mixture may be applied two different ways. First, it can be applied by a pressurized aerosol can charged with it. FIG. 3c is a transparent view of the aerosol spray can 200 including the compressed gas propellant 220, and the sealant 210 (fiber, binder, solvent mixture) for air filter leaks (such as HEPA and ULPA high efficiency air filters). Since the fibers are small enough, the aerosol can 200 is sufficient to provide a fine fiber spray 300 of the fibrous mixture 210. By directing this spray 300 at the leaks 110 in a filter, a fine layer of fibers will patch the leak 110 as shown in FIGS. 3b. When the sealant or binder cures over time, the resultant patch can patch the leak with a porous sealant similar to the media with minimal or no blocking of the filter (see FIG. 3b), as compared with the current caulking technique shown in FIGS. 1a-b. In addition to a blockage free seal of the leak, the use of aerosol cans can be a more convenient and less cumbersome means for fixing leaks in the field.

In accordance with an alternative embodiment of the present invention (not shown), an aqueous solution of the fibers with solvent and pressurized with a propellant, and of the binder with solvent and pressurized with a propellant, can each be independently applied by pressurized aerosol cans charged with them, respectively. In this case, the area to be repaired 110 will be treated with multiple aerosol cans (as opposed to a single aerosol can 200, as shown in FIG. 3c), i.e., alternately with the fiber mixture and the binder, similar to multiple coats of spray painting. In both cases, multiple coating of the mixture may be required much like multiple coats during common spray painting.

By appropriate choice of the binder, one may alter the rate of curing for the patch with or without heat. For example, in accordance with an embodiment with the present invention, once the repair sealant mixture 210 has been applied (e.g., as a spray), the resultant patch can be cured either by heat if the acrylic esther latex is used, or by humidity or ambient air depending on the type of adhesive binder used. Acrylic binders require heat to cross link and cure and can be achieved by hot air guns. The heat will also evaporate any water associated with the mixture that is deposited on the filter. Where heat is not allowed for other operational reasons at the installation, other adhesives can be used. In this case, the moisture can be removed by normal air flow, albeit at a potentially slower rate.

In accordance with an alternative embodiment of the present invention, where a spray is not acceptable, the same fiber and binder slurry (with solvent but without propellant), may be brushed over the leak 110 for a similar blockage free sealing of leaks 100. Also, where the leaks 110 in the filter are obvious, the fiber and binders may be applied over the leak by means of a brush or sponge. As with the spraying described above, the fibers and binders may be applied as one mixture or separately.

In yet another embodiment of the present invention where a pressurized spray is not acceptable or desirable, the fiber and binder slurry (with solvent but without propellant), may be manually applied over the leak 100 for a similar blockage free sealing of leaks 100. This includes any known method or means of manual application, including using a brush, sponge, syringe, or squeeze bottle, pouring the slurry over the leak, or any other mechanism of non-propellant manual delivery. As with the spraying described above, the fibers and binders may be applied as one mixture or separately.

While the invention is susceptible to various modifications, and alternative forms, specific examples thereof have been shown in the drawing and are herein described in detail. It should be understood, however, that the invention is not to be limited to the particular forms or methods disclosed, but to the contrary, the invention is to cover all modifications, equivalents and alternatives falling within the spirit and scope of the claimed invention.

DEFINITIONS

The following definitions are provided to facilitate claim interpretation:

Present invention: means at least some embodiments of the present invention; references to various feature(s) of the "present invention" throughout this document do not mean that all claimed embodiments or methods include the referenced feature(s).

First, second, third, etc. ("ordinals"): Unless otherwise noted, ordinals only serve to distinguish or identify (e.g., various members of a group); the mere use of ordinals implies neither a consecutive numerical limit nor a serial limitation.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control. If the definitions provided above are broader than the ordinary, plain, and accustomed meanings in some aspect, then the above definitions shall be considered to broaden the claim accordingly.

To the extent that a patentee may act as its own lexicographer under applicable law, it is hereby further directed that all words appearing in the claims section, except for the above-defined words, shall take on their ordinary, plain, and accustomed meanings (as generally shown by documents such as dictionaries and/or technical lexicons), and shall not be considered to be specially defined in this specification. In the situation where a word or term used in the claims has more than one alternative ordinary, plain and accustomed meaning, the broadest definition that is consistent with technological feasibility and not directly inconsistent with the specification shall control.

Unless otherwise explicitly provided in the claim language, steps in method steps or process claims need only be performed in the same time order as the order the steps are recited in the claim only to the extent that impossibility or extreme feasibility problems dictate that the recited step order (or portion of the recited step order) be used. This broad interpretation with respect to step order is to be used regardless of whether the alternative time ordering(s) of the claimed steps is particularly mentioned or discussed in this document.

What is claimed is:

1. An in situ porous air filter patch formed from a mixture comprising:
   a. a micro fiber glass; and
   b. a polymeric binder, wherein said mixture is pressurized with a propellant within a housing prior to application to a leak or hole in an air filter, and wherein said patch allows for active filtration after application of said mixture to the leak or hole.

2. The patch of claim 1, wherein said mixture further comprises a solvent.

3. The patch of claim 2, wherein said solvent is selected from the group consisting of water, acid alcohol, and a mineral spirit.

4. The patch of claim 2, wherein said micro fiber glass comprises borosilicate fibers.

5. The patch of claim 4, wherein said polymeric binder is selected from the group consisting of acrylic ester latex, urethane, silicone, and a moisture cure adhesive.

6. The patch of claim 5, wherein said propellant is a compressed gas selected from the group consisting of nitrogen, air, and other non highly flammable gas.

7. The patch of claim 6, wherein said mixture comprises less than 10% micro fiber glass.

8. The patch of claim 7, wherein said mixture comprises up to 50% polymeric binder.

9. The patch of claim 8, wherein said housing is an aerosol can.

10. An in situ porous air filter patch formed from a mixture comprising:
    a. a micro fiber glass; and b. a polymeric binder, wherein said patch allows for active filtration after application to a leak or hole in an air filter.

11. The patch of claim 10, wherein said mixture further comprises a solvent.

12. The patch of claim 11, wherein said solvent is selected from the group consisting of water, acid alcohol, and a mineral spirit.

13. The patch of claim 10, wherein said micro fiber glass comprises borosilicate fibers.

14. The patch of claim 10, wherein said polymeric binder is selected from the group consisting of acrylic ester latex, urethane, silicone, and a moisture cure adhesive.

15. The patch of claim 10, wherein said mixture comprises less than 10% micro fiber glass.

16. The patch of claim 10, wherein said mixture comprises up to 50% polymeric binder.

* * * * *